United States Patent [19]

Frissora et al.

[11] 4,232,655
[45] Nov. 11, 1980

[54] SOLAR ENERGY COLLECTION

[75] Inventors: Joseph R. Frissora; Michael H. Platt, both of Corning, N.Y.

[73] Assignee: Owens-Illinois, Inc., Toledo, Ohio

[21] Appl. No.: 919,029

[22] Filed: Jun. 26, 1978

[51] Int. Cl.³ .............................................. F24J 3/02
[52] U.S. Cl. .................................. 126/420; 126/443; 126/450; 126/422; 126/448
[58] Field of Search .............. 126/270, 271, 420, 450, 126/422, 448; 237/1 A; 137/59–62; 165/168, 170

[56] References Cited

U.S. PATENT DOCUMENTS

| | | | |
|---|---|---|---|
| 3,799,145 | 3/1974 | Butterfield | 126/271 |
| 4,027,821 | 6/1977 | Hayes et al. | 126/271 |
| 4,029,081 | 6/1977 | Strong | 126/271 |
| 4,044,754 | 8/1977 | Cronin et al. | 126/271 |
| 4,060,072 | 11/1977 | Johnson | 126/271 |
| 4,116,219 | 9/1978 | Nurnberg | 126/420 |
| 4,119,087 | 10/1978 | Cook | 126/420 |
| 4,120,285 | 10/1978 | Nugent | 126/271 |
| 4,122,830 | 10/1978 | Hapgood | 126/271 |
| 4,133,338 | 1/1979 | Honikman | 126/420 |
| 4,138,996 | 2/1979 | Cartland | 126/420 |

OTHER PUBLICATIONS

"Solar Heating System Design Manual," ITT Training and Education Department, Fluid Handing Division 1976, pp. 4–9 to 4–15.

*Primary Examiner*—James C. Yeung
*Attorney, Agent, or Firm*—John R. Nelson; Myron E. Click; David H. Wilson

[57] ABSTRACT

The invention is a solar energy conversion apparatus in which several evacuated, glass tubular collectors are connected together in a liquid circulation system for controlled movement of a liquid between the interior of the collectors and a storage tank. Liquid circulation is controlled by sensors and switches therefor in regulating operation of valves and/or a pump. The conditions for circulating the liquid rely upon (1) sensing a need for energy at the storage tank, (2) sensing solar radiation availability, (3) sensing thermal conditions in the solar collector tubes to avoid high temperature and thermal shock, and sensing a need to withdraw hot liquid and add more. The system is operable in either of two modes herein disclosed: (a) the "continuous batch circulation" mode in which liquid is pumped to fill the tubes, in parallel, and low temperature sensed below a set point to stop pumping and resume pumping when the temperature in the tubes arrives at the preselected higher temperature, and (b) the "full continuous circulation" mode in which liquid is continuously pumped through the tube collectors, in parallel, continuously withdrawing liquid from the top of the tube while introducing liquid at the bottom of the tube; in either mode, the hotter liquid being removed from the top of the tubes and relatively colder liquid introduced at the bottom of the tubes. The invention includes a full drainability of all the tubes of the system under control when conditions are sensed to call for draining the tubes; such as, the end of the solar day, the storage tank temperature exceeds a certain value (enough energy is stored), or tube temperature is too high; and, restarting of circulation of liquid to the tubes is abated until their temperature is within preselected operating range. The system will operate using water without additives without danger of freeze up and all collected energy is placed in storage at the end of a solar day period. The system includes a second circulation system through the storage tank to remove the heat in utilizing it, such as in a domestic hot water system. This second system removes water to be heated from the base of its hot water tank and pumps it through a heat exchanger in the solar heated liquid tank and back to the top of the hot water tank.

21 Claims, 7 Drawing Figures

SOLAR ENERGY COLLECTION

The present invention relates to the collection of solar radiant energy and transforming that energy to heat in a liquid, such as water; and more particularly to a system in which solar energy is collected in an evacuated tubular collector to heat a liquid that is transported in a circuit to a storage tank, whereby the collector is efficiently and safely operable and the collector is completely drainable under control upon conditions prevailing in the circuit.

BACKGROUND OF THE INVENTION

Advanced, efficient solar collectors of the type disclosed in U.S. Pat. Nos. 3,952,724; 4,043,318; 4,018,215; and 4,033,327 are currently in use. The collectors are comprised of glass concentric tubes, one within the other, and sealed together to provide an annular space between them that is evacuated to a hard vacuum i.e. $10^{-4}$ Torr. The outer "cover tube" is transparent and the inner "absorber tube" is selectively coated over the surface that is in the vacuum space. These tubes are inserted in liquid tight connections in a manifold and a liquid, e.g. water, is pumped into each of the absorber tubes to fill them and is pumped through the tubes in series to extract the heat of the solar radiation absorbed by the absorber tubes.

The collectors also are equipped with various reflectors, as is set out in U.S. Pat. No. 4,022,160, such that diffuse as well as direct sunlight reach the absorber tubes of the device.

It is most significant to utilize water as the heat extraction medium for many uses and for many reasons; which include the economy and availability of water, its desirable thermal coefficients as a heat extraction medium, and its non-toxic properties. On the other hand, water freezes at relatively undesirable high temperature in field service and during inactive periods in cold climates, such as in the northern regions of the United States in winter, requiring precautions against freeze up in the system. Heretofore, mixes of anti-freeze compounds in the water have been used as one way to combat this problem, however, such measures introduce toxic properties to the heat extraction media.

Also, in the prior systems wherein water is used with or without anti-freeze compounds in mixtures, the collector system must be operated continuously to extract the heat of the solar energy collected so as to prevent excessive operating temperature buildup on the tubes. Accordingly, as an example of domestic hot water demand or heating and cooling demands or the combination thereof in a solar operated installation there are periods, such as in spring or fall seasons, when excess solar energy is being absorbed by the collector of the system over the needs or demand for thermal energy thereby.

The excess collection requires "dumping" some of the energy, that is, the excess must be diverted to special air handlers or cooling towers resulting in nonproductive energy cost and equipment expenditure of a system.

In some systems, such as in U.S. Pat. Nos. 4,027,821 and 4,044,754, freeze protection is provided by sensing temperature differential or temperature in the water in the collector. However, these flat plate collector systems provide for continuous operation during solar day periods in which water is pumped continuously through the collector and to the tank so long as solar radiation maintains a temperature differential value or the water in the collector is not approaching freezing point. By the present invention there is envisioned a need for more precise control over drainability and in particular to the operation of the advanced, evacuated tubular collectors, there is a need for control of the water circulation during operation to enhance performance.

SUMMARY OF THE INVENTION

The present invention provides a drainable collector apparatus and a system which will permit efficient methods of operation in extraction of the heat from absorbed solar radiation; and will provide complete drainability of the liquid upon command or upon power failure; and pure water can be used in the system without danger of freeze up by virtue of the ability to fully drain the collectors; i.e. the absorber tubes. The drainable collector comprises an elongated manifold which feeds a number of the evacuated collector tubes connected on the higher elevation side of the manifold such that the manifold is at the lower elevation of an array of the tubes. The liquid is fed into each tube from the manifold through an orifice designed to restrict the flow rate into each tube and the tubes are all connected in parallel on the manifold. The restricted orifice supplies a pressure drop across it at the entrance of liquid to the tube and this is substantially greater than the pressure drop along the length of the manifold connecting the several tubes together, plus any difference in elevation of the outlet of the collector tubes along the manifold, i.e. the manifold should be pitched upwardly from its drain end to the far end. The collector tube includes a small diameter longitudinal pipe which extends from the manifold to near the tip end of its absorber tube. The longitudinal pipe has sufficient diameter such that during filling each tube any liquid as may tend to overflow into the pipe will not fill it and thereby always vent the air in the absorber tube. The system controls liquid flow rate as to gpm such that the vent pipe does not completely fill at any time the pump is on. The restricting orifice in the feed of liquid into each of the collector tubes provides a practical control to achieve this and the pumping rate, i.e. the pump itself, need not be precisely controlled but merely set to a predetermined gpm rate.

The invention provides a circuit for liquid through the plural collector tubes introducing relatively colder liquid at the bottom and removing the hotter liquid at the top. The liquid is circulated to a storage tank pumping it from the bottom of that tank and returning the hotter liquid from the collectors to the top of the tank. The pump is connected in a line of the circuit which extends to the bottom of the collector tubes and a vent line is connected to the top of the storage tank from the top of the collector tubes. In at least one form of the invention, there is another line on the pump side of the circuit which by-passes the pump back to the tank and this by-pass line has a controlled valve for blocking that by-pass during operation in the collectors so that circulation of liquid through the collectors is always bottom-to-top as indicated. The energy collection operation is monitored and controlled such that the collector tubes are empty at the start of a solar day and after the empty solar tubes are at a selected temperature and a need for energy in the system is established, the pumping circuit to the collectors is initiated filling the tubes in parallel with liquid until overflow. At this point the system is operable by either of two methods, (a) the full continuous circulation method in which the pump continues to operate to pump liquid into the collector tubes at a rate that is less than a full overflow of the vent opening in the top of the collector tube chamber, the overflow and air passing to the tank through the vent line; or (b) the continuous batch circulation method in which the pump fills the tubes with liquid which is lower in temperature than the tubes and the operating temperature setting, as sensed in the liquid in the tube, stops the pump at water temperature below a preselected operating temperature, thereby holding the "batch" of liquid in the collector tubes until heated to the set operating temperature, whereupon the pump starts and liquid is circulated by overflow through the vent line to the tank continuously until the liquid temperature in the collector tubes is reduced below the preselected temperature.

The invention also provides other control features, whereby the temperature of liquid or energy level in the tank reaches a preset point, the liquid in the collectors is dumped back into the tank and energy collection is discontinued until a demand again arises for more energy. With the collectors drained, they stagnate without energy extraction by liquid circulation. Or, in the alternative, if the liquid in the liquid tank is at the preset point, when conditions otherwise call for filling empty collector tubes, pumping will be prevented because there is no further demand for energy collection in the system.

Also, a safety feature is provided in the invention. If the collector tubes exceed an operating temperature considered safe for the tubes, all liquid is immediately drained to the storage tank and further filling of them is abated until temperature in the collector tubes is again below a level that is safe for introducing liquid to the collectors without damage, such as by thermal shock.

Other advantages and features of the invention will become apparent from the following description and the accompanying drawings which are illustrative of certain preferred embodiments of the invention that is herein claimed.

DESCRIPTION OF THE PREFERRED EMBODIMENT

Figure 1:
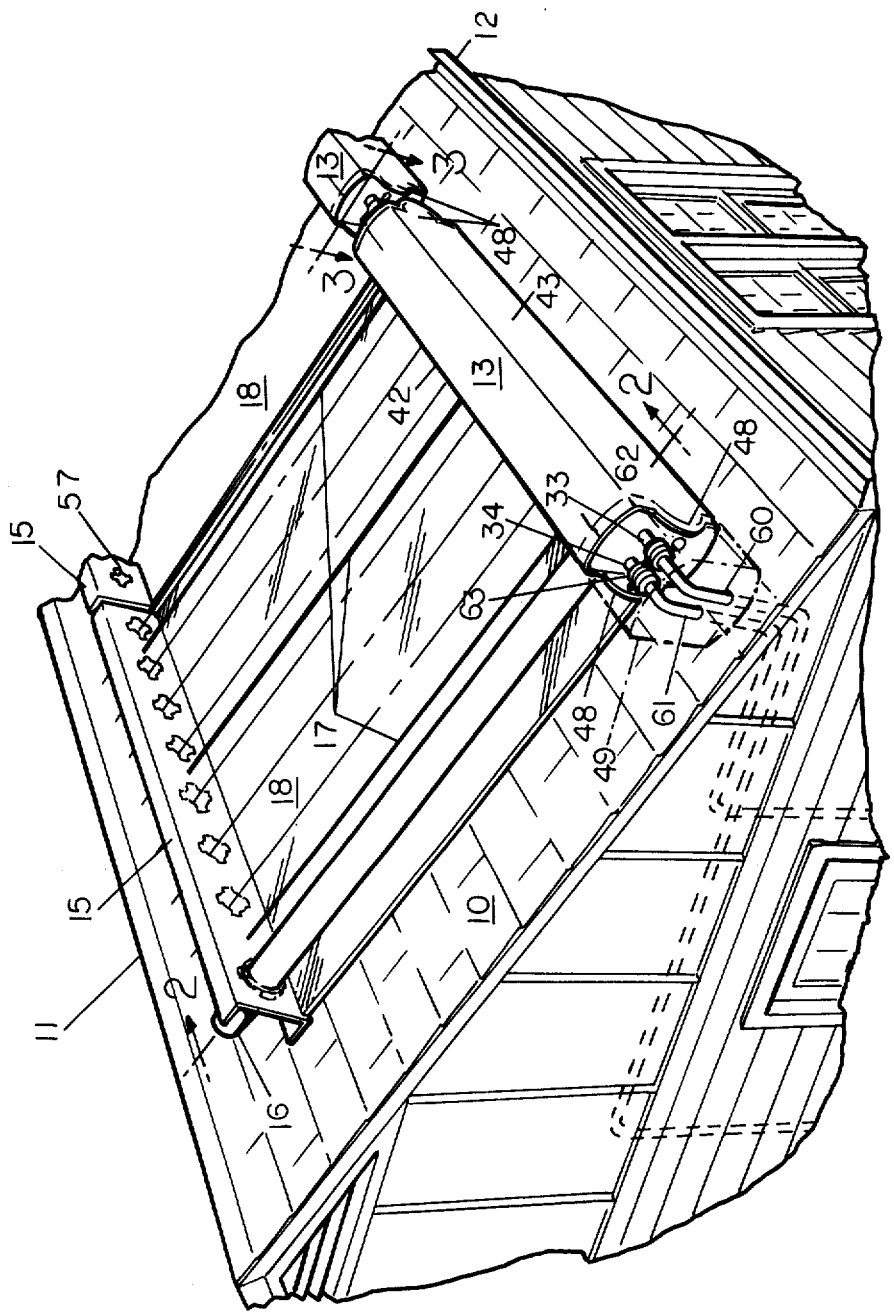
FIG. 1 is a perspective view of the drainable, evacuated tubular solar collector used in our invention shown in operating position on the pitched roof of a building.
Figure 2:
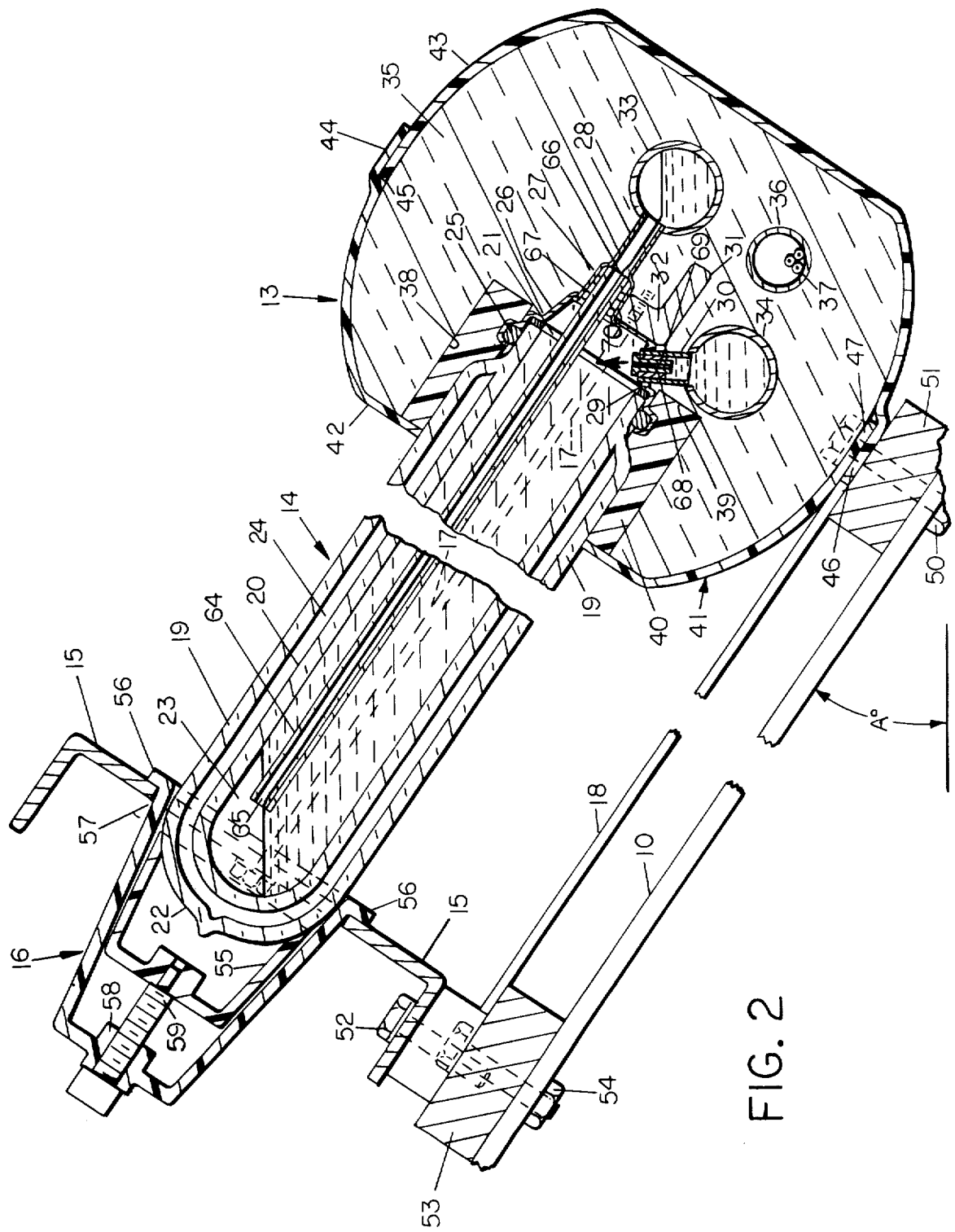
FIG. 2 is a sectional view taken along line 2—2 on FIG. 1.
Figure 3:
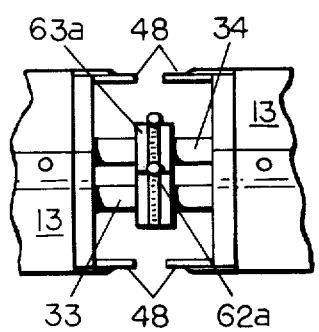
FIG. 3 is a fragmentary view of the connection between two modules or sections of the collector shown on FIG. 1.

Referring to FIGS. 1-3, the drainable solar collector is illustrated in an operating installation on the roof 10 of a building, and is disclosed and claimed in the application of co-inventor Joseph R. Frissora, herein, Ser. No. 918,995 filed on the same date as the present application, and commonly owned. The roof has some pitch from the upper ridge 11 to the eaves 12. In the illustrated example on FIG. 1, the pitch of about 20° (the angle A) above horizontal is used. (The collector's pitch angle A is variable from very near 0° to near 80°.) The solar collector is preferably installed on a southern exposure (northern hemisphere) of the building such that the axis of manifold 13 lies in the east/west direction and the axes of the parallel array of plural solar collector tubes 14 (but one of which is shown on FIG. 1 for simplicity of illustration) are in the North/South direction. Accordingly, the sun during a "solar day" moves from right to left on FIG. 1 across tubes 14. The tubes 14 are assembled in a modular unit, or units (two of which are indicated on FIG. 1) which comprise the manifold 13, the upper bracket channel 15, tube end caps 16 and the tie rods 17 threaded at their ends and bolted at one end in the manifold (as will be presently described) and bolted at the other end to the channel bracket 15. The modular unit also includes some form of backside reflector, which is in the form illustrated a planar diffuse reflector surface 18, such as disclosed in U.S. Pat. No. 4,002,160, or may incorporate shaped reflectors as is disclosed in U.S. Pat. No. 4,091,796, or in U.S. Pat. No. 4,002,499.

As shown on FIG. 2, the solar collector tube 14 is comprised of a double wall glass hollow test-tube shaped element having a transparent glass outer wall 19 and radially spaced inner wall 20. Tube 14 is preferably on the order of 2½ inch O.D. and 4-7 foot length. The outer surface of inner wall 20 is coated with a wave length selective coating and the outer wall 19 is sealed by annular fusion with the inner wall 20 near or at the open end 21 of the double wall glass tube. The enclosed annular space 24 between walls 19 and 20 surrounding the tube is evacuated to a hard vacuum on the order of $10^{-4}$ Torr and tipped-off in conventional fashion at a tubulation on the closed end 22 of the tube. Inside wall 20 defines an interior chamber 23 open at the one end. The tube 14 as constructed is described more completely in the patent to Pei, U.S. Pat. No. 4,043,318, mentioned hereinabove. This comprises an advanced, glass, evacuated tubular solar collector element that is highly efficient in converting solar radiation into thermal energy at the tube interface on wall 20. The energy conversion from solar to thermal is accomplished by the coating on wall 20, and in the use of selective coatings, this conversion is relatively, highly efficient (on the order of 70% efficiency).

The solar tube 14 is connected onto a manifold 13 by a ring gasket or grommet 25 in the flange of annular receptacle or cup 26 of the manifold. There are a plurality of the cups 26 spaced along one side of manifold 13 and each cup opening is facing the same direction. The center axes of cups 26 are substantially parallel. In a preferred construction, cup 26 and a pipe fitting 27 is assembled in the cup bottom by brazing, soldering or the like. The pipe fitting 27 has a lower reduced end pipe 28 that depends in an axial direction from the cup 26. For simplicity of construction, the pipe fitting 27 is placed off center of the bottom of cup 26 on what will eventually be the high elevation side thereof when assembled for operation (see FIG. 2). Along tapered sidewall 29 of the cut and opposite the pipe fitting 27 is a second aperture adjacent bottom end of cup 26 into which a stub-pipe 30 is firmly fastened. The axis of the stub-pipe 30 is located at the low elevation side of the cup in the manifold when assembled for operation (see FIG. 2).

In the assembly of the manifold parts, a steel or structural angle member 31 includes arcuate, spaced-apart notches (not shown) on its upper flange 32 which receive the depending pipe fitting 27 and nest them in place. The bottom end of cups 26 butt on the top of flange 32. This places the cups in their proper attitude for operation, as will become more apparent hereinafter, and the manifold is further fabricated by placing two larger diameter header pipes in place and attaching the connections to the cups, as follows. The end 28 of pipe fitting 27 is securely fastened (e.g. by brazing or soldering) at a preformed opening in air header pipe 33. Pipe 33 extends the length of manifold 13. Preferably, the air header pipe 33 is metal, i.e. copper or brass, which provides a suitable material match with cup 26 and pipe fitting 27. The holes for connecting the ends 28 of the series of fittings of the cups are formed along the length of pipe 33. In a similar manner, the second pipe, which is water header pipe 34 made of a similar material, has the spaced predrilled holes to receive the outer open end of stub-pipe 30, which are likewise securely fastened, i.e. brazed or soldered, onto the pipe 34 thereby connecting each of them into pipe 34.

The manifold insulation 35 is molded around the metal structure, just described, to form the manifold as shown on FIGS. 1 and 2. Additionally, the manifold includes a lengthwise conduit 36 which will receive electric control wires 37 as needed to connect the control sensors and the like. This is added in the manifold structure so that electrical components used with any of the tubes 14 of a collector module or a series of modules may be conveniently located and installed in the system. The manifold insulation 35 is preferably a cellular, lightweight material, such as foamed polyurethane of about 3 lb. per cu. ft. density. The mold in forming the insulation 35 matches with the tops of cups 26 to define annular ports each defined by a continuous side 38 (FIG. 2) and end 39. These ports open along one side of the manifold which will face the high elevation of manifold 13 when the solar tubes 14 are assembled. Foam (rubber or synthetic) inserts prefabricated as cylindrical sleeves 40 are placed in the ports of the manifold and fit adjacent the mouth flange of cups 26. Cylinder sleeves 40 will be compressed by the glass wall 19 of each tube 14 as it is placed in a cup 26 in assembled position. The sleeve 40 being of the compressible material mentioned assures a liquid tight seal of each tube 14 in manifold 13 keeping out rain, moisture or the like. The sleeve further insulates against heat loss or heat transmission at the solar tube's connection in the manifold. The exterior of the insulation 35 is covered with a formed shell 41, which is preferably molded from a fiber glass reinforced, resin sheet as two complementary half segments 42 and 43. The edge 44 of top segment 42 is offset outwardly to overlap with the adjacent edge 45 of lower segment 43. In a similar way the other edge 46 of the bottom segment 43 is outwardly offset and overlaps on the edge 47 of the top segment. The overlaps at 44, 45 and at 46, 47 are fastened together, such as by rivets, to finish the manifold.

As shown on FIG. 1, the opposite ends of the shell for the manifold modular sections include parallel arcuate tabs 48. Prefabricated, half section inserts 49 (in dotted outline on FIG. 1) are placed at the ends of the modules and similar inserts (not shown) are secured in place between modules connected to one another in end-to-end fashion. Intermodular connection of the pipes 33 and 34 is shown on FIG. 3.

As may be seen on FIG. 2, the manifold 13 of a module is attached by nut-bolt fasteners 40 extending through the overlap layers 47, 46 of manifold shell 41, through a stringer member 41 and the roof 10 fastening it in place. It is important that the manifold be pitched down from its end toward the pipe connections for the piping circuits 40 and 41 of the system. Utilizing a pitch angle of about 2° from horizontal will fully drain the collector. At the upper end of the module the bracket channel 15 is fastened by cap screw 52 into an upper stringer member 53 attached to roof 10 by nut-bolt fasteners 43. The reflector, such as a white panel 18, is attached for support by the stringer members 41 and 53.

Tubes 14 are held seated in cups 26 by an end cap device which includes truncated inner cup 55 made of plastic engaging its closed end and an outer plastic truncated cup 16. The outer cup extends through a splined aperture 57 formed in the vertical web of the channel bracket 15 (see FIG. 1). The edge of cup 16 at its large open end has radially extending spaced bosses 56 which match in size and location with the spline cut-outs of the aperture 57 in the bracket 15 so that outer cup 16 and inner cup 55 may be assembled from the side of bracket 15 opposite the manifold. In assembly, the tube 14 is inserted through an aperture 57 and the open end 21 is seated in manifold cup 26 inside gasket 25. The inner cup 55 is placed over the protruding closed end 22 of the tube 14 and outer cup 16 concentrically placed over cup 55 such that the outwardly flanged bosses 56 thereof (FIG. 2) pass through the spline cut-outs of aperture 57 (FIG. 1). After bosses 56 are through aperture 57, the outer cup 16 is twisted (rotated) to lock bosses 56 along the manifold side of bracket 15. Tension is applied to axially load tube 14 in the manifold cup 26 by tightening the center screw 59 in the threads of the journal aperture 58 at the closed end of cup 16 against the closed end of inner cup 55. This loading by tightening screws 59 holds the tube 14 in the manifold cup 26. The end bolted tie rods 17 spaced along the module fasten the bracket 15 and the angle member 32 in the manifold together mechanically to prevent the manifold's buckling; in other words, the manifold 13 is tied rigidly to the bracket channel 15 by the series of rods 17. The rods 17 are disposed along the bracket and manifold, respectively, at spaced intervals located between certain of the tubes 14.

The solar collectors being in place, as described, the one header pipe 33 is connected to a pipe 60 (FIGS. 1 and 4) of the solar tank system by a hydraulic clamp-style coupling 62; and the other header pipe 34 is similarly connected to a pipe 61 of the solar tank system by the same style of coupling 63. The successive modules mounted in a line along the roof are connected (FIG. 3) together by a hydraulic coupling 62a connecting the lengths of header pipe 33 to each other and a hydraulic coupling 63a connecting the lengths of header pipe 34 to each other. The far ends of the last module in the installation have the pipes 33 and 34, respectively, capped and sealed so as to close the end of that pipe.

The important aspect of the invention will now be described in reference to FIG. 2. As a key part of the assembly of the tubular collector and manifold in the closed system of the drainable collector of this invention, the pipe fitting 27 in each cup 26 receives an air vent tube 64. Preferably, tube 64 is glass, such as laboratory or chemical tubing. The vent tubes 64 are desirably of equal length and extend such that their open upper end 65 is near the top of the chamber 23 within the tube 14. This is shown in one form on FIG. 2 utilizing a straight length of glass tubing. The lower end 66 of tube 64 is seated in an annular gasket 67 held in the large section of pipe fitting 27.

Another key part of this assembly for each tube is the orifice insert 63 placed in the innermost end of the stub-pipe 30 in the water line and held by a tube-like gasket 69. The insert 68 has a precise size of axially extending passageway 70 bored through it to connect water in pipes 34, 30 to the chamber 23 inside solar tube 14. The insert 68 may take other forms such as by threading it in pipe 30 or swagging it therein, etc.; however, it is desirable to remove inserts 68 from time to time for operational reasons or for maintenance. Therefore, it is desirable to provide a readily removable insert in pipe 30.

Figure 4:
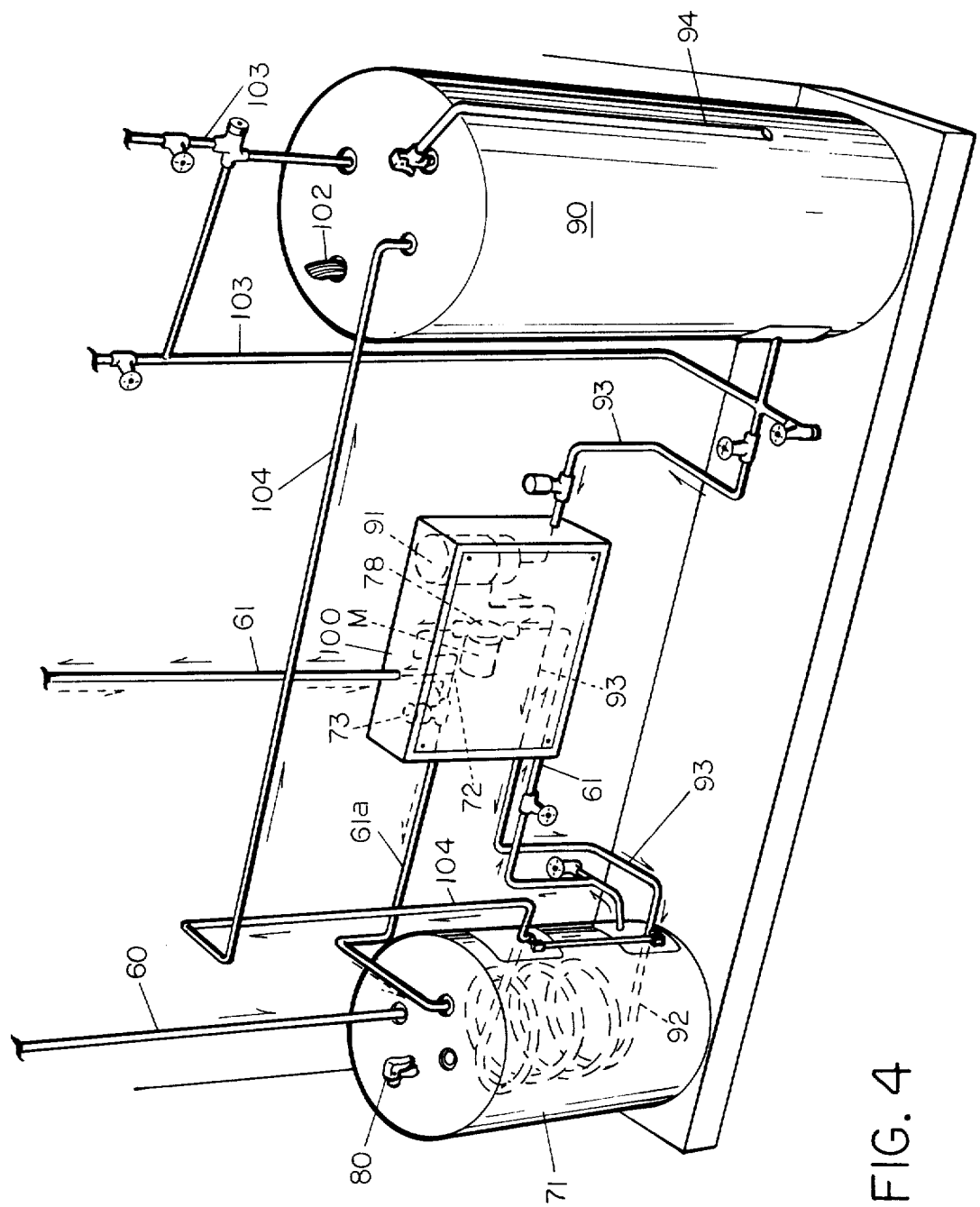
FIG. 4 is a perspective view of the balance of the system of the invention which is connected with the solar collector of FIG. 1 and shown as it may be installed in a basement or other room area of the building.

Referring to FIG. 4, in conjunction with FIG. 1, a first pipe line 61 is connected into the bottom part of a solar water tank 71. This tank 71 is a steel tank that has an external insulation for the solar heated water storage and is located at a lower elevation than the collectors, such as in the basement or lower floor of the building. This first line 61 is coupled at a union into a continuation of the line within the housing of a housing box 100 which houses a centrifugal pump 78 driven by its electric motor and controlled in a starter circuit hereinafter described. The line 61 is connected to the inlet side of pump 78 and extends from the outlet of the pump to a T-connection fitting at 72. The line 61 extends from there to the header pipe 34 of the collector manifold on the roof. Also connected to the T-fitting 72 is a second pipe line 61a which is a pump by pass circuit and is connected through a solenoid-operated valve 73 that is normally open and when its solenoid is energized the valve is held closed. The line 61a has a union coupling at the side of housing box 100 and from there extends into the top of tank 71. A pressure relief valve 80 is included on the top of the tank and is connected into the tank headspace.

Alongside the solar tank is a conventional domestic hot water tank 90 which has electric resistance heater elements therein and is wired through the conduit 101 (shown at the top of tank 90). The electric heater source will operate as a standby, auxiliary heat source for the domestic water during periods when solar heated liquid in tank 71 is not available. The tank 90 is piped into the domestic water system of the building, as illustrated on FIGS. 4 and 5 by the piping 103 and 104, for utilization of heated water. Water from tank 90 is piped into the side of box 100 by pipe line 93 and to a water pump 91. From the pump the pipe line 93 is connected to the bottom of tank 71. Pipe line 93 is connected to a heat exchanger coil 92 mounted in tank 71 which is connected to a pipe line 104 which extends into the top of hot water tank 90. The installation is further schematically illustrated on FIG. 5. The header pipe 33 is shown in an alternative hook-up of collector modules wherein pipe line 60 is T-connected to the header 33 at an intermediate point between modules. In similar fashion, the water header pipe 34 is T-connected to the pipe line 61. In such installation, the manifolds on either side of the T-connections is sloped slightly toward their drain end into the pipes 60, 61. Pipe 60 extends into the top level of solar water tank 71, preferably into the head space of that tank. The pipe 61 extends to a junction point 72 from which one leg of pipe 61a is connected to a solenoid-operated valve 73. At the opposite side of this valve the pipe extends into the top portion of tank 71. Beyond pipe junction 72, pipe line 61 is connected in series to a one-way check valve 74, a flow regulating valve 75, flow-rate meter 76, water pressure gauge 77 and the outlet side of a centrifugal motor driven pump 78. Pipe 61 is connected at the inlet side of pump 78 and then into the bottom strata of the solar water tank 71. The circuit of the system just described is a closed system and includes a pressure relief valve 80 on the tank 71 and a vacuum breaker vent 81 in a pipe 82 that is connected in the line 60 near the collectors and extends into the air space (headspace) in tank 71. Also, relief valve 83 is attached onto the fill pipe 34 and relief valve 83a is attached onto vent pipe 33. The relief valves 80, 83 and 83a are set for suitable pressures for normal operation of the system; e.g. valve 80 releases at 25 psi, valve 83 releases at 20 psi and valve 83a releases at 30 psi. Preferably relief valve 83 should be set to release at a pressure below the release of relief valve 83a. If the fill line 61 is blocked to tank, liquid will release at valve 83 when gas pressure in the tubes 14 become excessive. If lines 61 and 60 are both blocked to tank, and if valve 83 malfunctions, relief valve 83a will release excessive gas pressure in tubes 14. Any time the system pressure becomes excessive, valve 80 in tank 71 will release to neutralize pressure in the system.

Figure 5:
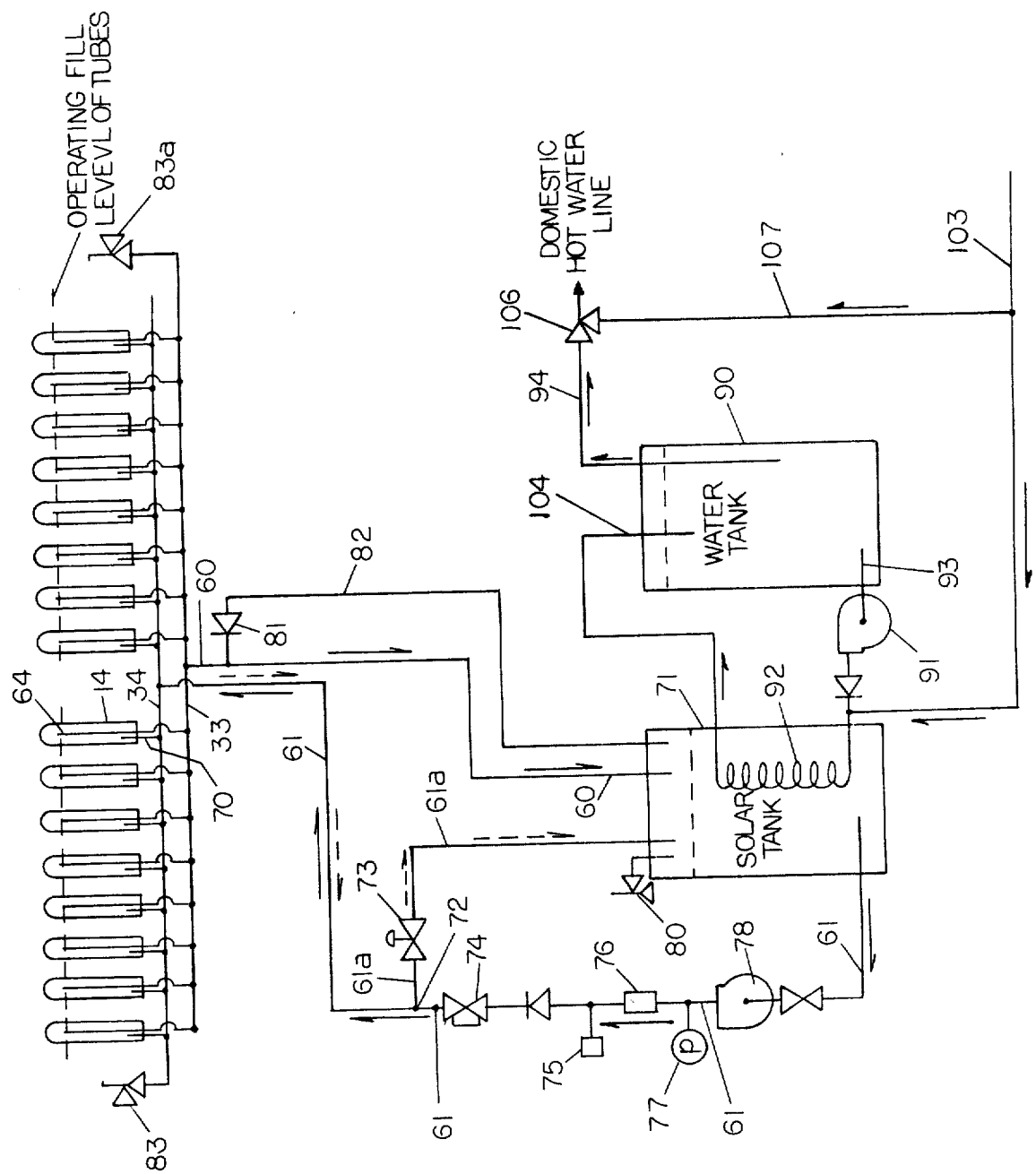
FIG. 5 is a schematic diagram for the drainable solar collector system, shown on FIGS. 1 and 2, connected for use in a system for producing solar heated water.

As schematically represented on FIG. 5, tank 90 receives its make-up water from the water supply line 103 T-connected between pump 91 and coil 92. Hot water is withdrawn from tank 90 via line 94 connected to a conventional thermostatic mixing valve 1.06 which is the domestic hot water circuit. Mixing valve 106 is fed fresh cold water from supply line 103 through the line 107 T-connected to it.

THE CONTINUOUS BATCH CIRCULATION SYSTEM

Figure 7:
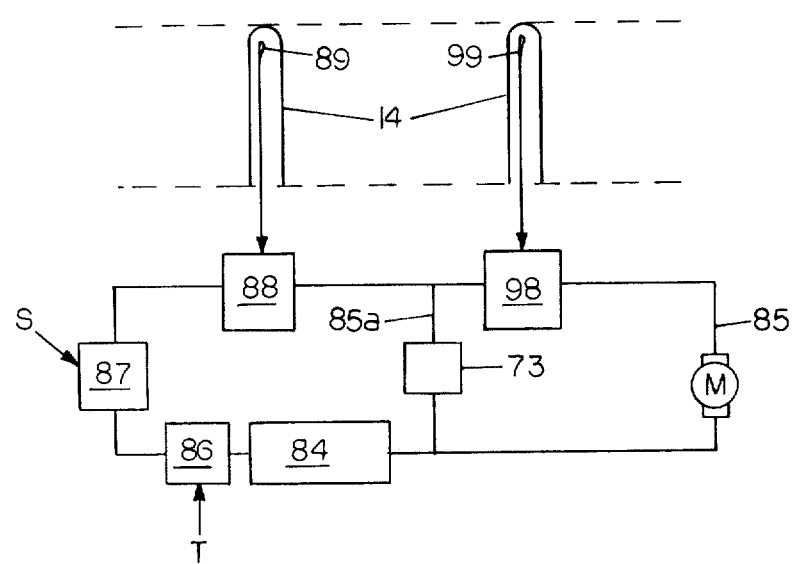
FIG. 7 is a schematic electrical control diagram for the operation of the system shown on FIG. 5 in the continuous batch circulation mode illustrating a further embodiment of the invention.

Referring to FIG. 7 the schematic electrical control diagram for the unit shown on FIG. 5 enables operation of the system in the continuous batch circulation mode. There are control means provided that responds to preselected temperature conditions in the liquid circuit, including the solar tube chambers for operating the pump and closing the solenoid valve in its second line path, for pumping the liquid at controlled, preselected flow rate. Such control comprises a sequence of switches connected in series in the circuit supplied by a low voltage power supply, i.e. 24 volt d.c. In sequence, the switches are first a thermostatic switch located near the base strata of the water in the solar tank and preset to open at or above a maximum temperature for liquid storage, such as 180° F., indicating that the maximum amount of energy has been stored in the solar tank. The second switch of the series is a photo cell, normally open, switch that is closed responding to sunrise and remains closed when daylight is present, and which opens at dusk to shut the system down. The third switch in the series is a high-temperature safety switch and a thermostatic switch of the type used in domestic ovens may be used. The switch has a capillary and bulb located in the liquid chamber of one of the solar tubes and is preset to open the circuit at a temperature which will inhibit the entire system should there be a danger of breakage of glass tubes due to thermal shock. When all three switches are closed, the solenoid valve (NO) in the drain line is energized and closed to prevent draining of the system to the solar tank. The pump will operate as long as these three switches are closed. The pump in the system of FIG. 5 is throttled to control the flow rate through the collector tubes at optimum rate for energy collection from solar radiation, and a check valve is in the pump line to prevent feed back to the pump. A fourth switch which is similar to the third switch (a thermostatic type switch) is in the series to the pump and has its thermal sensor submerged in the water of a filled solar tube. This switch is preset to close when temperature of the water in the solar tube exceeds a preset value.

In this mode, upon closing all four switches the pump is started and the solenoid valve is closed. Water fills all the tubes. Inasmuch as the fourth switch will close after sensing a certain operating temperature inside the solar tube chamber, the solar tubes may be exposed to some solar radiation to warm them at the start of the day and before the pump starts. As the solar tubes are filled with water, assuming the water temperature at the start of the day may be below preset operating temperature, the pump will shut down, but the solenoid valve remains closed. The system now is static, and the water in the solar tubes remains there until heated above the temperature for closing the fourth switch again starting the pump and circulating the water through the vent tube overflow back to the tank. Again, when lower temperature is in the collector the fourth switch again opens stopping the pump. At times the cycle will repeat throughout the day performing the continuous batching of the water in the tubes. At other times in periods of high solar insolation, the water of the system will be at a temperature above the preset value of the fourth switch such that the pump will operate continuously to maximize the heat removal from the system, and minimize static periods and the probability of boiling the water.

In reference to FIG. 7, the thermostatic switch 86 in the base of tank 71 is closed in response to temperature levels T that are below the preset value (e.g. 180° F.). Switch 86 is in circuit with the power supply 84, preferably a 24 volt d.c. source. The photocell switch 87 is closed by the solar radiation S stricking it. The high temperature safety switch 88 will sense high temperatures within the solar tube 14 that create thermal shock danger. This switch 88 is preset to be closed below the danger point temperature (E.g. 290° F.). The solenoid of the valve 73 is in the circuit 85a with power source 84 and valve 73 remains closed at all times there are sensed the conditions T, S and safe operating temperature in the tubes. The fourth switch 98 is in a parallel circuit 85 with the starter of motor M and it is preset to close above a given temperature existing in the tubes 14. This switch 98 will close at the set value, e.g. 140° F., when the tubes and/or water are at that value and remain closed at sensed temperatures above that value. When closed, switch 98 completes the circuit to operate motor M of the pump. Thus, in this continuous batch mode, the pump will cycle on and off after filling the tubes until the water in the system is all above the preset value, whereupon the pump will run continuously.

In the control, at any time there is loss of daylight or excess temperature conditions in the storage tank or in the solar tubes, the system is automatically shut down. Shut down also occurs at the loss of power by power outage or the like.

The pumping rate in gpm is preferably set for a selected size (dia.) of passageway 70 in the orifice insert and I.D. of vent tube 64. During pumping in the first line of the system there is a pressure drop across the passage 70 from pipe 34 to the interior of cup 26-chamber 23 of each solar tube in the system. Water will fill the solar tubes 14 in parallel flow until the water level in the collector tube chamber 23 allows water to spill over the open end 65 of the vent pipe 64, but most importantly the pumping rate will be less than a flow of water through passageway 70 and overflow into vent tube 64 that will completely fill the vent tube. Accordingly, there remains an open air vent passage in the third line of the system through tube 64 to the header pipe 33 and back to the solar tank 71. Additionally, the flow, or overflow as the case may be, of water from tube 64 in the third line will be to header pipe 33, which is designed to be of sufficient size (diameter) to maintain a flow of both water and air to the solar tank. It is important that the pipe 33 will never fill with water to block the air flow to the tank; otherwise, an undesirable siphoning condition will occur.

When the solar tank water contains thermal energy converted from absorbed solar radiation, and the system wishes to utilize that energy, the water (or media) to be heated thereby is pumped from the lower strata of a conventional domestic hot water tank 90 and circulated by pump 91 through heat exchange coils 92 in the solar water tank, then back to the top of water tank 90 via the discharge pipe 93. Hot water as needed is withdrawn by the water line 94 for domestic hot water or like utilization.

Again considering the foregoing method of the invention, if during solar day operation a condition arises to cause one of the first three switches (86-88) in the series circuit 85 to open (FIG. 7), two things will occur immediately: (1) the motor M of the pump will stop, and (2) solenoid valve 73 will open. The entire collector system will now drain emptying all the water in the solar tubes to the solar tank via the several passageways 70, header pipe and pipe circuit 61, 61a. In draining, the water follows the dashed arrow path (FIG. 5). Flow in pipe 61 past junction point 72 is prevented by one-way check valve 74. Inasmuch as each passageway 70 is at the low elevation side of its tube cup 26 and tube chamber 23 (FIG. 2), all liquid will drain from the solar tubes and into the solar tank by gravity. Also, when the solar day ends and solar cell switch 87 is caused to open, the entire system drains automatically returning all the water to the solar tank. Since all water is returned to the solar tank 71 at the end of the solar day, maximum amounts of the collected solar energy are kept in the solar tank and thermal losses are minimized. All the collected energy, less line losses, if any, is placed into the solar tank. This avoids the freeze problem of the water and obviates the need for anti-freeze solutions.

THE FULL CONTINUOUS CIRCULATION SYSTEM

In this mode of operation, the system of FIG. 5 is modified somewhat. Basically, two liquid lines are established between the solar tank 71 and the collector header pipes 33 and 34, respectively. The first liquid line 61 is established by the connection to the bottom of the solar tank and to the inlet of pump 78. The pressure gauge 77 and flow regulator 76 are retained, however, check-valve 74 is eliminated. Also eliminated is the by-pass circuit 61a from T-junction 72 to the tank, including the solenoid valve. The first line 61, as before connects to the header pipe 34. The second liquid line 60 remains as is shown on FIG. 5, that is it connects the header pipe 33 with the top headspace of tank 71.

Figure 6:
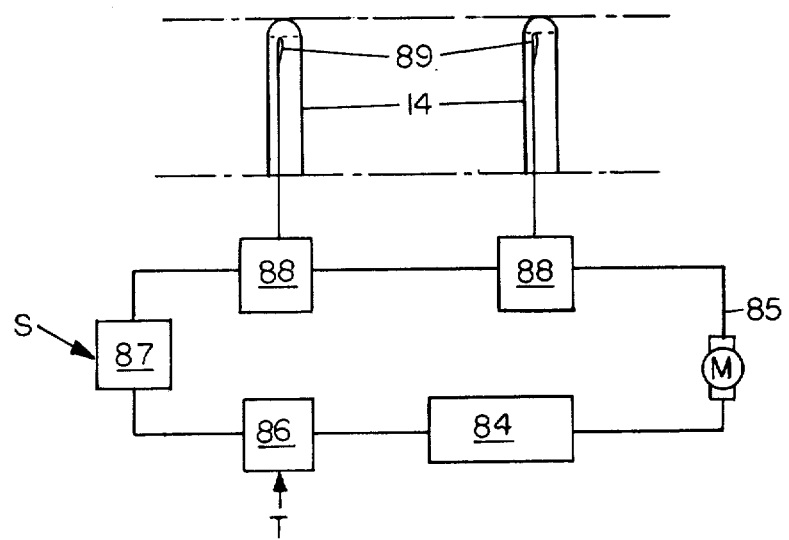
FIG. 6 is a schematic electrical control diagram for the operation of the system shown on FIG. 5 in the full continuous circulation mode illustrating an embodiment of the invention.

Referring now to FIG. 6, the control for this system includes the power supply 84 (a 24 v. d.c. source) which is in the series circuit 85 with three switches and the motor M of pump 78. The first switch 86 is the same as shown and described on FIG. 7, that is, it regulates total energy of the tank by sensing temperature T input and opens above a temperature, e.g. 180° F. The second switch 87 in circuit is a photocell switch closed by solar radiation S. The third switch 88 is the high temperature safety switch with the probe 89 in the solar tube 14, and is set to open above a preset safety temperature level, e.g. 290° F.

FIG. 6 illustrates a second high temperature safety switch, the same as switch 88, which provides assurance of the safety feature. The second switch 88 is a redundant control in the event the other switch 88 malfunctions, i.e. fails to open above the high temperature safety point. The two switches '88 are installed in separate solar tubes 14 in each module of say, 10 or more tubes.

The circuit 85 also includes a starter for the pump motor M driving the pump 78. Of course, the motor M of pump 78 includes the conventional connection to a 110 v. a.c. power source in circuit with its starter to run the motor and drive the pump.

Circuit 85 is energized and the pump motor started whenever switches 86, 87 and 88 are closed. Water is pumped in the first line 61 (solid arrows on FIG. 5) from the solar tank and into the solar collectors. Pump flow and output is regulated in line 61 by the flow valve 75 and flow meter 76 to the desired gpm. The pump will run whenever (a) daylight exists, (b) water in the solar tank is below the preset limit temperature, e.g. 180° F., and (c) the inside temperature of the solar tubes are in the safe operating range, e.g. below 290° F. During this time, the flow of water at controlled gpm rate will continue in each of the restricted passageways 70 to the solar tube chambers to fill them and continue thereafter to overflow into the vent tubes 64 and return to the top of the tank via line 60. This will continue until one of the switches 86–88 opens. Normally, the latter will occur at dark at which time switch 87 will open. At such time, the pump will stop and all of the water in the collector tubes and header pipes will drain back through the pump in line 61 and return to the solar tank. In the system described, pump 78 is a centrifugal-type pump which will allow back flow through it to the solar tank whenever such pump is not operating.

If a pump other than centrifugal pump is used, the circuit on FIG. 5 may be employed using the solenoid valve 73 and pump by-pass line 61a together with one-way check valve 74; however, the solenoid of valve 73 must now be connected in series in circuit 85 the same as the pump motor (FIG. 6) is connected between the nearby switch 88 and the adjacent side of power source 84.

The invention described herein has been successfully operated in accordance with several examples given hereinafter.

EXAMPLE 1

Utilizing the structure of the drainable collector, substantially as described, four collector modules of 8 tubes each were connected end-to-end. Each of the solar tubes 14 in the collectors was equipped with an orifice insert as shown and described herein. The passageway 70 through the insert was sized to 0.093 inch diameter (3/32"). A 10 mm size glass vent tube (64) in each of the collector tubes was used. The average I.D. of 10 mm glass tubing is approximately 8 mm (0.134 inches). Tap water was pumped from the solar tank to the manifold header pipe (34) made of one inch copper pipe and a head about 12 feet above the pump at a flow rate of 0.075 gpm per module (4×0.075 gpm total). In a solar insolation at Corning, N.Y. in the winter season, i.e. December to March, the collector performed at acceptable and satisfactory operating conditions in efficiency in the full continuous mode, described hereinabove. Siphoning was avoided. Filling and draining of the collectors were each satisfactory.

EXAMPLE 2

The same system described in Example 1 was operated at a pumping rate of 0.35 gpm per module (4×0.35 gpm total) and the same satisfactory results. Siphoning was avoided and filling and draining were each satisfactory.

EXAMPLE 3

The same system of Example 1 was used with the exception the orifice passageway in the inserts in each of the collector tubes were 1/16 (0.062") diameter. Pumping rate was kept to 0.05 gpm per module (total of 0.15 gpm). Results were again satisfactory in filling and draining the collectors; and siphoning was avoided.

EXAMPLE 4

The same system described in Example 1 was used with the exception the orifice passageway in the inserts in each of the collector tubes were ⅛ (0.125") diameter. Pumping rate was 0.25 gpm per module (4×0.25 total). The system operated satisfactorily in filling and draining the collectors; and the siphoning effect was avoided.

There is need for some pitch of the manifold in the installation back to the drain to the tank (analog pipe 34) for draining the collector completely and satisfactorily. The collector tubes of the modules are installed with some pitch (angle A) down to the manifold. The water header pipe 34 for draining the water and feeding the water into the collector should be of relatively larger diameter compared to the diameter of the restricted passageway (70) into each cup and chamber of the collector tubes. And, the vent tube I.D. has a definite relationship to the restricted passageway (70) in that it need be larger than the orifice passageway. Pumping rate per module of given number of collector tubes must be established to keep each of the vent tubes in the collectors from filling with water, as described earlier herein. The hydraulics design will further depend upon the size of the system, i.e. the number of modules. The data given herein has considered a design of up to 10 modules, each module having 8 collector tubes and utilizing standard 10 mm glass tubing as the vent tube in each solar collector tube. Water header pipe (34) and air header pipe (33) are of one inch diameter standard copper tubing.

The invention herein described demonstrates a solar collector comprised of a plurality of evacuated solar tubes and a manifold which has the ability to load the interior chamber of all of the solar tubes in parallel and under control and with sufficient pressure drop in the orifice between the main water header pipe and the interior of the solar tube to overcome any variations in the elevation of flow rates in the return vent tube piping circuit. If otherwise, the system can be subject to siphoning, or can allow boiling of the water in some of the tubes and flow in other tubes. This invention provides an immediate drainability feature upon command. Moreover, freeze up of a collector using water as the energy transfer medium is no longer a concern and in down times or between solar periods (days) of energy availability, collected energy is retained in the system most efficiently, i.e. the energy collected is all conducted to the storage facility—the solar tank in this case.

Although water is given as a preferred example for working fluid, it should be understood that other liquids or mixtures may be utilized within the spirit and scope of the invention.

While certain specific preferred embodiments and details of the invention been have been described for illustrative purposes, it is evident that various other changes and modifications may be made without departing from the spirit of the invention. In the appended claims, it is intended that all changes and modifications for those given herein and incidental to the spirit of the invention are to be included as part of the invention.

Accordingly, the following is claimed as the invention:

1. A solar energy conversion apparatus of the type wherein a heat transport liquid is circulated between a solar energy collection area and a thermal energy storage and exchange device which comprises in a combination:
   a plurality of solar collectors receptive of solar radiation, each said collector comprising a double-wall tubular collector with a sealed, annular evacuated space between the walls, the collector being closed at one axial end and open at the other, an energy absorbing surface on the inner wall, the outer wall being transparent, and a cup element providing a mouth opening sealingly connected about the open end of said collector to define a closed chamber for circulation of liquid to and from said chamber to be heated by absorbed solar radiation at said inner wall, each said chamber having top and bottom regions,
   a storage tank for said liquid disposed at a substantially lower elevation from said collectors,
   a first liquid line connected between said storage tank and the bottom region of each of said chambers the latter being connected in parallel, for conducting liquid therebetween,
   a restricted flow passage in the first liquid line connection to said bottom region of each of said parallel connected chambers extending through the cup element,
   a pump in the first liquid line operable for pumping liquid in said line from said tank to said collector chambers,
   a second line including plural end openings, means to dispose said plural end openings such that one end opening is in the top region of each of said chambers, and said second line is also connected to the top space in the storage tank for (a) venting air in the upper region of the chambers to the storage tank, and (b) conducting liquid entering said plural end openings by gravity flow to the tank, and
   control means responsive to preselected temperature condition existing in one or more of said chambers for operating the pump and thereby pumping liquid from the storage tank to the solar collector chambers, the flow of liquid into each of said chambers being at a rate less than full flow in said end opening of the second line therein, whereby the overflow liquid from the chambers and air return to the storage tank are each through said second line, said pumping being discontinued whenever such preselected temperature condition in said chambers no longer exists.

2. The apparatus of claim 1 in which the pump is a centrifugal type pump and fluid in the collectors may drain to the storage tank by gravity through the first line when the pump is inoperative.

3. The apparatus of claim 1 wherein said means to dispose said plurality end openings of the second line are connected in parallel with said double-wall collectors comprises a vent tube extending through the cup element of each of said collector, one end thereof being open and in the top region of said chamber and the other end being in said second line.

4. The apparatus of claim 1 or claim 3 in which said means responsive to preselected temperature in one or more of said chambers for operating the pump comprises a power means operably connected to drive said pump, an electrical control circuit for operating said power means including an electric source, a temperature responsive first switch including a temperature sensor in at least one of said chambers, said switch being normally closed at temperatures that are within the safe operating temperatures for said collectors and a second switch that is light-operated to close by available solar radiation, said switches being series connected in said circuit.

5. The apparatus of claim 4 which includes a temperature responsive third switch in series in said circuit that is normally closed at temperatures below that selected for the maximum operating temperature of the storage tank, said third switch including a temperature sensor connected to the liquid in the storage tank.

6. The apparatus of claim 5 in which said first switch is preset to open above 290° F.

7. The apparatus of claim 5 in which said third switch is preset to open above 180° F.

8. A solar energy conversion apparatus of the type wherein a heat transport liquid is circulated between a solar energy collection area and a thermal energy storage and exchange device which comprises in a combination:
   a plurality of solar collectors receptive of solar radiation, each said collector comprising a double-wall tubular collector with a sealed, annular evacuated space between the walls, the collector being closed at one axial end and open at the other, an energy absorbing surface on the inner wall, the outer wall being transparent, and a cup element providing a mouth opening sealingly connected about the open end of said collector to define a closed chamber for circulation of liquid to and from said chamber to be heated by absorbed solar radiation at said inner wall, each said chamber having top and bottom regions, a storage tank for said liquid disposed at a substantially lower elevation from said collectors, a first liquid line connected between said storage tank and the bottom region of each of said chambers, the latter being connected in parallel, for conducting liquid therebetween, a restricted flow passage in the first liquid line connection to said bottom region of each of said parallel connected chambers and extending through the cup element, a pump in the first liquid line operable for pumping liquid in said line from said tank to said collector chambers, a second line including at its upper end plural openings in which one such opening is disposed adjacent the top region of each of said chambers and said second line is connected to the top space in the tank for (a) venting air in the chambers to the tank, and (b) conducting liquid entering said upper open ends of said second line by gravity flow to the tank, a third liquid line by-passing the pump and connected to said first line at a point between the pump and said restricted passages and connected to the tank, thereby by-passing the pump for return flow of liquid to the tank, a normally-open solenoid valve interposed in the third line operable for blocking flow to the tank through said pump by-pass path, one-way check valve means interposed between the pump and said connection of the third line to the first for blocking flow in said first line through the pump to the tank, and means responsive to preselected temperature in one or more of said chambers for operating the pump and closing said normally-open solenoid valve for pumping liquid from the tank to the chambers, said pumping being discontinued whenever such preselected temperature in said chambers no longer exists.

9. The apparatus of claim 8 in which the means for operating the pump and solenoid valve in response to preselected temperature comprise a control circuit including an electrical source and a first temperature responsive switch operatively connected to sense temperature within one of said collector chambers and a second temperature responsive switch operatively connected to sense temperature in one of said collector chambers, said first switch being in series in the circuit with the solenoid of said valve, said pump, and the said second switch being in series in the circuit with said pump, said first switch being normally closed and opened at preselected high temperature above safe operation of the collectors thereby opening said solenoid valve at said high temperature and stopping the pump, and said second switch being normally open and closed at a preselected lower temperature for operating the pump.

10. The apparatus of claim 9 in which said control circuit includes a third temperature responsive switch operatively connected to sense temperature of liquid in said storage tank and connected in series in the circuit with said solenoid and pump, said third switch being normally closed and opened at temperature selected above the maximum temperature for stored liquid, thereby opening the solenoid valve and disabling pump operation.

11. The apparatus of claim 9 in which said high temperature is at least 290° F. and said lower temperature is not greater than 140° F.

12. The apparatus of claim 10 in which the maximum storage temperature for liquid is at least 180° F.

13. The apparatus of claim 9 or claim 10 in which said control circuit further includes a normally open light operated switch in series in said circuit with said solenoid and said pump that is closed by solar radiation being available for the collectors.

14. The apparatus of claim 8 wherein said means for operating the pump and solenoid valve is further serially responsive to said preselected temperature in said chambers together with preselected temperature of liquid in the tank and the presence of solar radiation for reception by the solar collectors.

15. A solar energy conversion apparatus comprising
a plurality of glass double-wall tubular solar collectors receptive of radiation and each having a chamber for circulation of liquid to be heated by said solar radiation, each said collector comprising a sealed annular evacuated space between the walls which define a collector tube closed at its upper end and open at its other lower end and having an energy absorbing surface on the inner wall in said space and a transparent outer wall, a cup element sealingly connected about the open lower end of said collector tube thereby defining said chamber within said tube, a restricted flow passage to said chamber through said cup element, a longitudinally extending vent-tube connected to said chamber through said cup element and open at its upper end therein spaced from the upper closed end of said collector tube, the vent tube of each chamber being of substantially greater flow rate capability in relation to said restricted passage, a storage tank for liquid disposed below the lower end of said collectors, a first line connected between said storage tank and the restricted passage of all said chambers for conducting liquid in parallel therebetween, a pump in the first line operable for pumping liquid from said tank to said collector chambers, a second line connected between said storage tank and the vent tubes of all said chambers in parallel for venting air in the chambers to the tank and for conducting liquid entering the ends of said vent tubes to the tank, and means controlling the operation of the pump for (a) pumping liquid to the collectors in the first line and returning pumping liquid overflowing the vent tubes to the tank through the second line, and (b) emptying the collectors through the first line.

16. The apparatus of claim 15 which includes a third line connected from the first line to the tank and by-passing the pump in emptying the collectors, a one-way valve in the first line between the pump and the third line therein preventing flow to the tank through the pump and a solenoid valve in said third line operated by said control means whereby opening the solenoid valve drains the liquid from the collectors through the first and third lines respectively to the tank, and closing said valve blocks flow of liquid to the tank through said lines.

17. The apparatus of claim 16 wherein said solenoid valve is normally open and operatively closed by power from said control means, whereby power failure of the control means automatically drains liquid from the collectors.

18. The apparatus of claim 15 or claim 16 wherein the control means is operated responsive to temperature in the tubular collector chambers such that (a) liquid will not be pumped into said chambers when the temperature existing therein is below a preselected operating temperature or above a preselected high temperature at which a thermal shock of the solar tubes may occur, and (b) liquid will be drained from the tubes when at a temperature above said preselected high temperature.

19. The apparatus of claim 15 or claim 16 in which said control means is further operated responsive to a temperature of liquid in said storage tank whereby liquid is not pumped from said tank to the collectors and liquid in the collectors is drained to said tank when the temperature of liquid in said tank is above a preselected maximum temperature.

20. The apparatus of claim 15 or claim 16 in which said control means is further operated responsive to availability of solar radiation for said collectors, whereby liquid is only pumped to the collectors during periods of such available solar radiation and liquid in the collectors is drained to said tank whenever such solar radiation is no longer available.

21. The apparatus of claim 15 in which the control means is electrically operated by a source of electrical power and the collectors will be drained upon power failure.

* * * * *